Jan. 22, 1924.

G. A. BURNHAM 1,481,780

ELECTRICAL DISTRIBUTION SYSTEM

Filed Jan. 2, 1920

Inventor.
George A. Burnham
by
Greenwood Atty

Patented Jan. 22, 1924.

1,481,780

UNITED STATES PATENT OFFICE.

GEORGE A. BURNHAM, OF SAUGUS, MASSACHUSETTS, ASSIGNOR TO SEARS B. CONDIT, JR., OF BROOKLINE, MASSACHUSETTS.

ELECTRICAL DISTRIBUTION SYSTEM.

Application filed January 2, 1920. Serial No. 348,858.

*To all whom it may concern:*

Be it known that I, GEORGE A. BURNHAM, a citizen of the United States, residing at Saugus, in the county of Essex and State of Massachusetts, have invented an Improvement in Electrical Distribution Systems, of which the following is a specification.

My present invention relates to electric distribution circuits adapted to carry relatively large values of current, and has more particular reference to an electric conductor, as a bus-bar, connected with switches for the controlled distribution of current to various parts of the system.

In a distribution system for large values of current, the buses and switches, which latter are usually oil-immersed, are arranged in proximity to each other, and relatively short and heavy leads are extended therebetween.

Due to the heavy currents carried by the bus-bars, they become appreciably heated, which heat may be augmented by a relatively warm circumambient temperature; and natural heat dissipation from the bus-bars, even with a laminated structure, is not sufficient to maintain a low operating temperature, because of insufficient heat dissipating area.

The heating and resultant relatively high temperature of the bus-bar seriously and detrimentally affects the operation of the oil immersed switches associated therewith.

It is essential that the temperature of the oil-immersed switch be maintained at a low value as otherwise the interrupting capacity of the switch will be greatly decreased, or its efficiency will be reduced and the switch will fail safely to interrupt the current and protect its circuit.

The leads connecting the switch with the heated bus-bars, as previously stated, are relatively massive and are excellent conductors of heat; and heat of the bus-bars is conducted through these conductors into the switch. The heat of the bus-bars is added to the heat generated in the switch itself with the result that the temperature of the switch reaches such a high value that it fails properly to operate.

An object of this invention therefore, is to provide the bus-bars with additional heat-dissipating area, or with cooling means, whereby to maintain them at a relatively low and safe operating temperature.

A further object is to provide the bus-bar with a plurality of independent cooling means arranged along its length in heat-exchanging relation therewith, by which heat is conducted along the length of the bus-bars to the cooling means for its dissipation.

Certain features of this invention are disclosed and claimed in my co-pending application filed January 24, 1920, Serial No. 353,716.

Figure 1:
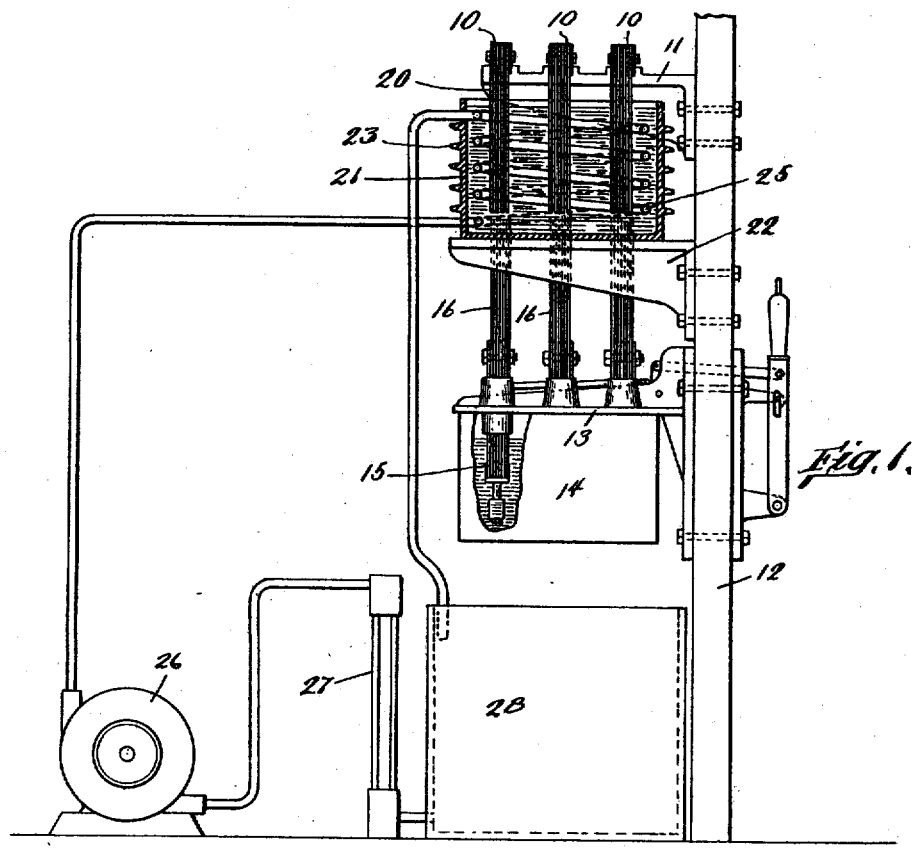
Fig. 1 is a side elevation of a portion of an electrical distribution system, including bus-bars and an oil immersed switch embodying my invention.
Figure 2:
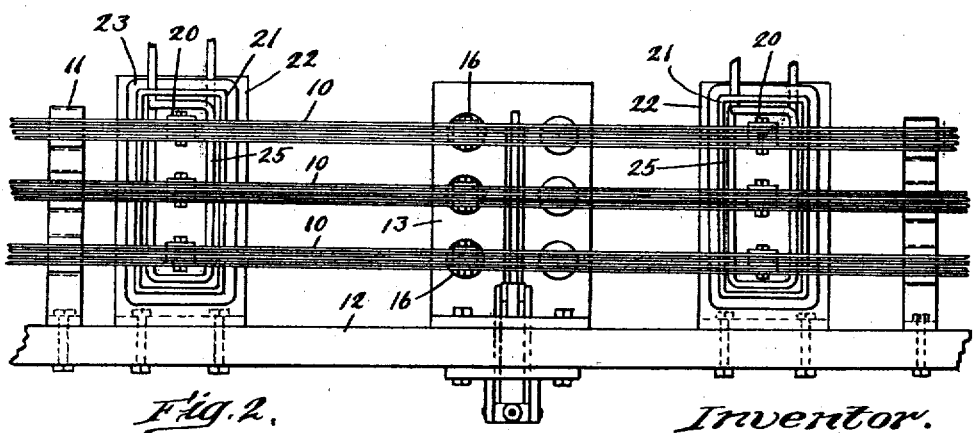
Fig. 2 is a plan view of Fig. 1.

As here shown the electrical distribution system includes the three parallel distribution conductors or bus-bars 10, for a three phase system, each formed of a plurality of spaced-apart bars mounted upon suitable insulating supports, as the bracket 11 secured to the back of the switch panel 12.

The bus-bars serve to distribute current from a current source, not shown, to a plurality of switches, one of which is here shown as comprising the frame 13 having the oil receptable 14 depending therefrom. The switch is secured to the back of said panel 12 below the bus-bars and a switch-operating handle is secured to the front of the panel, although the switch may be, and commonly is, arranged for remote control; in which event the panel will be replaced by other suitable supporting means.

The switch has stationary switch members 15, commonly laminated, which extend from the oil receptable, through insulators, above the switch frame, and massive leads 16, also laminated, are secured thereto and extend to, and are connected with the bus-bars. Said leads, as they are necessarily good electrical conductors, are also excellent heat conductors.

The bus-bar cooling means includes a plurality of independent cooling units associated therewith along its length and, preferably between each switch.

Each cooling unit comprises the independent bus-bar extensions 20 disposed along the length of the bus-bar. Each extension is formed of a plurality of strips interwoven with the bus-bar structure and having a suitable extent of heat-dissipating area; and each extension is in good heat-exchanging relation with the bus-bars. Means are provided to artificially cool said extensions thereby to abstract heat from the bus-bars, and the heat flow is along the bus-bars to the extensions where it is dissipated from the surface thereof.

A suitable cooling means may include the receptacle 21 of suitable dimensions mounted on a suitable support 22 extended from the switch panel 12 in proximity to said bus-bars and adapted to contain an insulating and heat absorbent fluid, as oil, in which said bus-bar extensions are immersed.

The oil acts to absorb the heat dissipated by said extensions and thereby to cool the bus-bars. The oil is adapted to be maintained at a relatively low temperature as by forming the oil receptacle from material having good heat conducting properties and providing it with relatively great heat dissipating surfaces, as by forming it with cooling fins 23; or the oil may be artificially cooled by circulating therethrough a cooling medium. For this purpose the oil receptacle has the cooling coil 25 immersed, and preferably entirely submerged, in the oil of the receptacle and spaced from the heat-conducting strips or bus-bar extensions 20 and insulated therefrom by the oil. The cooling coil is included in the circulating system comprising the pump 26, the radiator 27, and storage tank 28; and the arrangement of the component parts of the system is, preferably such that the direction of flow of hot cooling medium is from the cooling coil 25 into the storage tank, in which it may be partially cooled, and is circulated by the pump 26 through the radiator 27 and cooled, and again through the cooling coil 25, and abstracts heat from the oil. The direction of flow of the cold cooling medium in said cooling coil 25 is preferably in the direction of heat flow in the oil, which in this particular instance is upward from the bottom of the oil receptacle 20.

The cooling medium may be any suitable fluid, as water, or oil; or the oil in the receptacle 20 may be circulated through the cooling system.

In the operation of this system, heat flows along the bus-bars into the extensions 20 and is given up to the oil; and heat may also flow from the switches into the bus-bars and through the bus-bars into the cooling system, thereby to increase the current rupturing capacity of the switch.

As many units of isolated bus-bar extensions and cooling means therefor will be applied to isolated points on the bus-bar structure as are found to be necessary, in any particular installation, to adequately cool the distribution system.

The above described method of cooling the system is also adapted to be applied as an attachment to existing systems.

It is obvious that many modified arrangements may be devised all embodying the spirit of my invention.

I claim:—

1. An electrical distribution system including a conductor of substantial length heated by the current carried thereby, and cooling means therefor comprising a plurality of independent heat dissipating units associated with said conductor at independent points along its length arranged to abstract heat therefrom and dissipate the heat abstracted.

2. An electrical distribution system comprising a conductor of substantial length heated by the current carried thereby, an oil immersed switch electrically and thermally connected with said conductor, and cooling means for the system comprising a plurality of independent cooling units associated with said conductor along its length to abstract heat therefrom and from the system.

3. An electrical distribution system comprising a conductor of substantial length, a plurality of isolated receptacles adapted to contain an electrically-insulating, heat-absorbent fluid, as oil, said conductor having isolated portions thereof immersed in the fluid in said receptacles and in heat-exchanging relation therewith, and means to abstract heat from and cool the fluid in said receptacles, whereby to cool said conductor.

4. An electrical distribution system comprising a conductor of substantial length, and means to cool said conductor including a plurality of isolated receptacles adapted to contain oil, said conductor having isolated portions thereof immersed in the oil in said receptacles, and in heat-exchanging relation therewith, and means to abstract heat from and cause a circulation of cool oil about said immersed portions of said conductor.

5. An electrical distribution system comprising a conductor of substantial length, oil immersed switches in proximity to said conductor and electrically and thermally connected therewith, and means to cool said conductor and switches including a plurality of receptacles adapted to contain oil, said conductor having isolated portions thereof immersed in the oil in said receptacles and in heat-exchanging relation with the oil, and means to abstract heat from the oil in said receptacles, and cause a circulation of cool oil about the immersed portions of said conductor.

6. An electrical distribution system including an electric conductor of substantial length, said conductor also thermally-conductive throughout its length and heated by the current carried by it, and cooling means for said conductor comprising a plurality of isolated heat-absorbent units in thermal connection therewith along its length to draw heat along and absorb heat from said conductor, and means to dissipate the heat absorbed by said units.

7. An electrical distribution system comprising an electric conductor of substantial length, said conductor also thermally-conductive throughout its length, an oil immersed switch arranged in proximity thereto and electrically and thermally connected therewith, said system heated by the current carried by it, and cooling means for the system comprising a plurality of isolated, heat-absorbent units in thermal connection with said conductor along its length arranged to draw heat along and absorb heat from said conductor having means to dissipate the heat absorbed by them.

8. An electrical distribution system comprising a plurality of electrically-insulated parallel electric conductors of substantial length, said conductors also thermally-conductive throughout their lengths and heated by the current carried by them, and cooling means for said conductors comprising a plurality of independent heat-absorbent means, said conductors arranged in heat-exchanging relation with said heat-absorbent means, and each of said heat-absorbent means common to all of said conductors, and having means to dissipate the heat absorbed by them.

9. An electrical distribution system comprising a plurality of electrically-insulated parallel electric conductors of substantial length which are also thermally-conductive along their length and adapted to heat by the current carried by them, and cooling means for said conductors comprising a plurality of independent receptacles adapted to contain an electrically-insulating, heat-absorbent fluid, as oil, said conductors having isolated portions along their lengths immersed in the fluid in and insulated from said receptacles and in heat-exchanging relation with said fluid whereby the fluid will absorb the heat of said conductors, each receptacle being common to all of said conductors, and said receptacles, having means to dissipate the heat absorbed by the fluid therein.

10. An electrical distribution system comprising a plurality of electrically-insulated parallel electric conductors of substantial length which are also thermally-conductive along their length and adapted to heat by the current carried by them, and cooling means for said conductors comprising a plurality of independent receptacles adapted to contain an electrically-insulating, heat-absorbent fluid, as oil, said conductors having isolated portions along their lengths immersed in the fluid in and insulated from said receptacles and in heat-exchanging relation with said fluid whereby to give up heat to the fluid, each receptacle being common to all of said conductors, and means to dissipate the heat absorbed by the fluid in said receptacles and circulate cool fluid about said immersed portions of said conductors comprising artificial cooling means for the fluid.

11. An electric conductor of substantial length also thermally-conductive along its length and heated by the current carried by it, having a plurality of localized, enlarged, heat-dissipating portions along its length.

12. In combination, an electric conductor of substantial length also thermally-conductive along its length and heated by the current carried by it, and cooling means for said conductor comprising means to draw the heat along the conductor to a plurality of isolated portions thereof and abstract heat from the conductor at such isolated portions and dissipate the heat abstracted.

13. The combination of an electric conductor of substantial length also thermally-conductive along its length and heated by the current carried by it having a lateral extension secured in thermal connection therewith, and means to cool said extension, thereby to extract heat from the conductor.

14. The combination of an electric conductor of substantial length also thermally-conductive along its length and heated by the current carried by it having a lateral extension secured in thermal connection therewith, and a receptacle adapted to contain oil in which said extension is immersed, and means to cool the oil thereby to cool the conductor.

15. In combination with an electric conductor of substantial length also thermally-conductive along its length heated by the current carried by it, means to cool said conductor comprising a thermally-conducting conductor extension having substantial heat-dissipating area arranged to draw heat along said conductor and dissipate the heat, and means thermally securing said extension to said conductor.

16. In combination with an electric conductor of substantial length also thermally-conductive along its length heated by the current carried by it, means to cool said conductor comprising a thermally-conducting conductor extension, means securing it to said conductor in thermal-conduction therewith, and artificial cooling means for said extension thereby to cool the conductor.

17. An electric conductor heated by the current carried by it having a plurality of localized heat dissipating portions to which heat is adapted to be drawn from intermediate portions of the conductor to be dissipated, thereby to maintain the conductor cool, and means to absorb heat from said localized portions of the conductor and dissipate the heat absorbed.

18. An attachment for an electric conductor having substantial length and thermally-conductive along its length and heated by the current carried by it, comprising a thermal conductor-extension adapted to be secured to the conductor in thermal-conduction therewith, and a receptacle adapted to contain oil in which said extension is immersed having means to cool the oil in said receptacle, thereby to cool the conductor.

19. The method of cooling an electric conductor of substantial length which is also thermally-conductive along its length which consists in abstracting heat from and cooling localized portions of the conductor, thereby causing a flow of heat from the intermediate heated-portions thereof to the localized cooled-portions, whereby to cool the entire conductor.

In testimony whereof, I have signed my name to this specification.

GEORGE A. BURNHAM.